United States Patent [19]
Götz et al.

[11] Patent Number: 5,199,742
[45] Date of Patent: Apr. 6, 1993

[54] WHEEL COVER FOR CATCHING SPRAY WATER, DIRT OR THE LIKE

[75] Inventors: Hans Götz, Böblingen; Klaus Müller, Nagold, both of Fed. Rep. of Germany

[73] Assignee: Mercedes-Benz AG, Fed. Rep. of Germany

[21] Appl. No.: 854,104

[22] Filed: Mar. 19, 1992

[30] Foreign Application Priority Data

Mar. 20, 1991 [DE] Fed. Rep. of Germany ........ 4109129

[51] Int. Cl.⁵ .............................................. B62B 9/16
[52] U.S. Cl. .................................................. 280/851
[58] Field of Search ................................. 280/851, 848

[56] References Cited
FOREIGN PATENT DOCUMENTS

| | | |
|---|---|---|
| 1831898 | 5/1961 | Fed. Rep. of Germany . |
| 7108242 | 3/1971 | Fed. Rep. of Germany . |
| 3939937 | 2/1991 | Fed. Rep. of Germany . |
| 1516036 | 3/1968 | France . |
| 2004823 | 4/1979 | United Kingdom . |
| 2043006 | 10/1980 | United Kingdom . |
| 2050272 | 1/1981 | United Kingdom . |
| 2124988 | 2/1984 | United Kingdom . |

*Primary Examiner*—Eric D. Culbreth
*Attorney, Agent, or Firm*—Evenson, McKeown, Edwards & Lenahan

[57] ABSTRACT

A wheel cover for catching spray water, dirt or the like, which, in its operating position, is located opposite to and at a distance from the tread periphery of the associated wheel and protrudes downwards relative to the level of the vehicle floor and which can be moved upwards into a non-operating position in which it is substantially retracted into the body of the vehicle. No complicated guide is necessary for the changeover of the wheel cover between its operating position and its non-operating position, since it is hinged on the body of the vehicle and can be pivoted to take up the non-operating position under the vehicle floor.

7 Claims, 4 Drawing Sheets

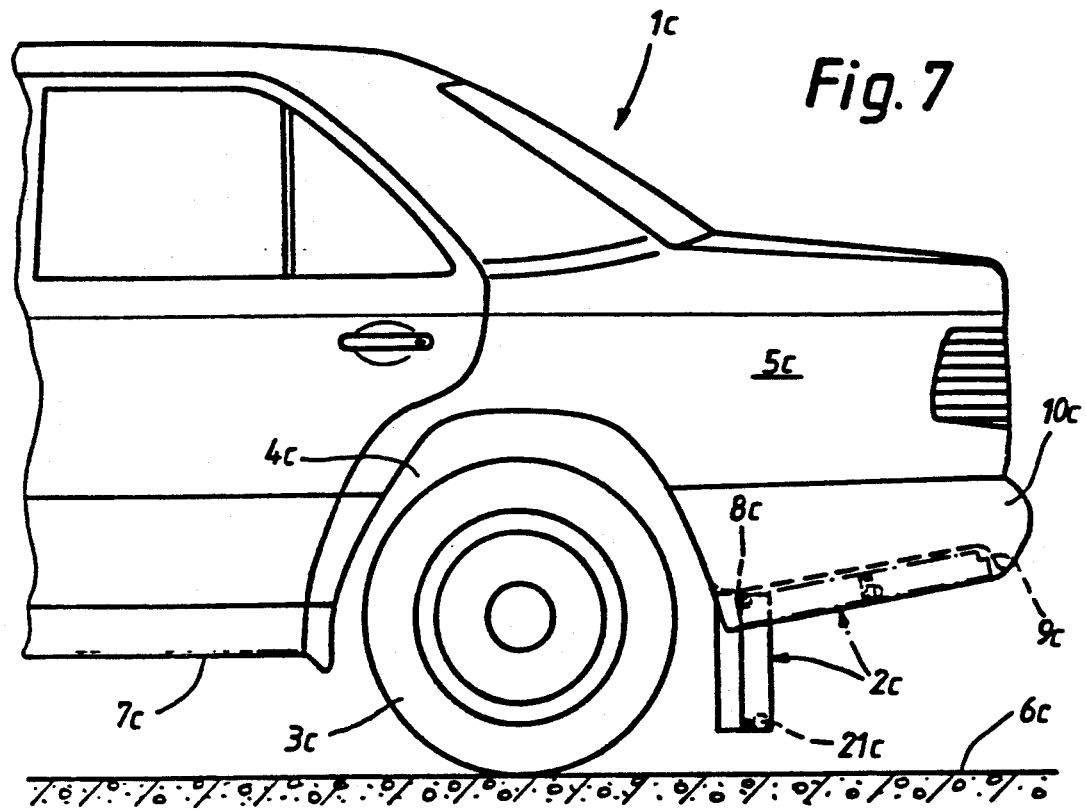
Fig. 7
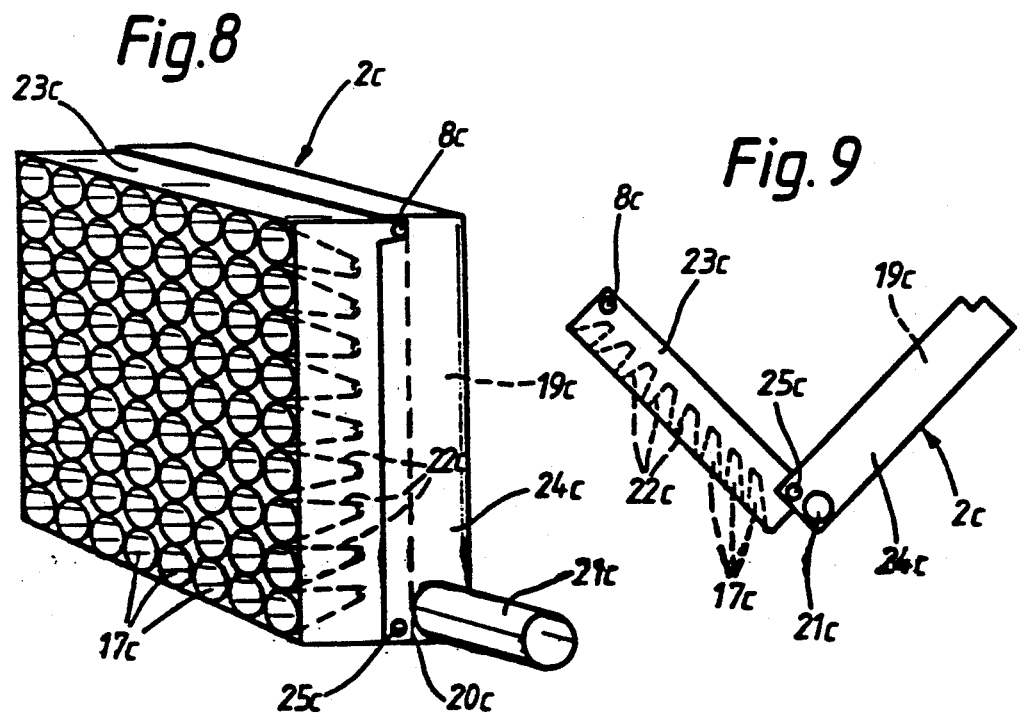
Fig. 8
Fig. 9

WHEEL COVER FOR CATCHING SPRAY WATER, DIRT OR THE LIKE

BACKGROUND AND SUMMARY OF THE INVENTION

The present invention relates to a wheel cover for catching spray water, dirt or the like, which is pivotably suspended on the body of a vehicle. The wheel cover, in its operating position, is located opposite to and at a distance from the tread periphery of the associated wheel and protrudes downwards relative to the level of the vehicle floor, and can be pivoted up from its operating position under the vehicle floor into a non-operating position.

A wheel cover is shown in German Patent Document DE-GM 1,831,898, in which a rectangular dirt catcher is supported in a vertical sliding guide and can be moved by means of a double-acting pneumatic cylinder. The sliding guide, which is bounded by a frame and into which the dirt catcher can be completely inserted, protrudes from the inside of a mudguard and extends in a transverse plane of the vehicle almost down to the level of the vehicle floor.

Such wheel covers, which are retracted out of the slipstream to the greatest possible extent in their non-operating position and are only extended when required, have a favorable effect on the aerodynamic drag of the vehicle.

The frame of this wheel cover for guiding the dirt catcher must, however, be constructed very strongly—particularly because of its cantilever length—so that it is not deformed by stones or the like thrown up by the wheel. A correspondingly strong design of the frame forming the guide means of the wheel cover, however, demands a not inconsiderable amount of installation space in the body of the vehicle and this space is not available in every body design concept.

An object of the invention is to provide a wheel cover which requires only a small installation space in the body of the vehicle for the guide means of the wheel cover.

This and other objects are achieved according to the invention which provides a wheel cover for catching spray water, dirt or the like, which is pivotably suspended on the body of a vehicle and, in its operating position, is located opposite to and at a distance from the tread periphery of the associated wheel and protrudes downwards relative to the level of the vehicle floor, and which can be pivoted up from its operating position under the vehicle floor into a non-operating position. The wheel cover includes first and second preformed shells foldably connected together, these preformed shells forming a hollow body in their operating position which folded one upon the other. The first preformed shell of the hollow body faces towards the tread periphery and is penetrated by catchment pockets. The first preformed shell, jointly with the second preformed shell, bounds a drain channel. The preformed shells foldable upwardly into an unfolded non-operating position in which they are located under the vehicle floor one behind the other.

Other objects, advantages and novel features of the present invention will become apparent from the following detailed description of the invention when considered in conjunction with the accompanying drawings.

BRIEF DESCRIPTION OF THE DRAWINGS

FIG. 7 is a side view of the rear region of a motor vehicle with a wheel cover constructed in accordance with another embodiment of the present invention.

FIG. 8 shows a perspective view of the wheel cover of FIG. 7 by itself in a folded condition of the hollow body parts.

FIG. 9 shows the partially unfolded hollow body parts of the wheel cover of FIG. 8 in a side view.

DETAILED DESCRIPTION OF THE DRAWINGS

Figure 1:
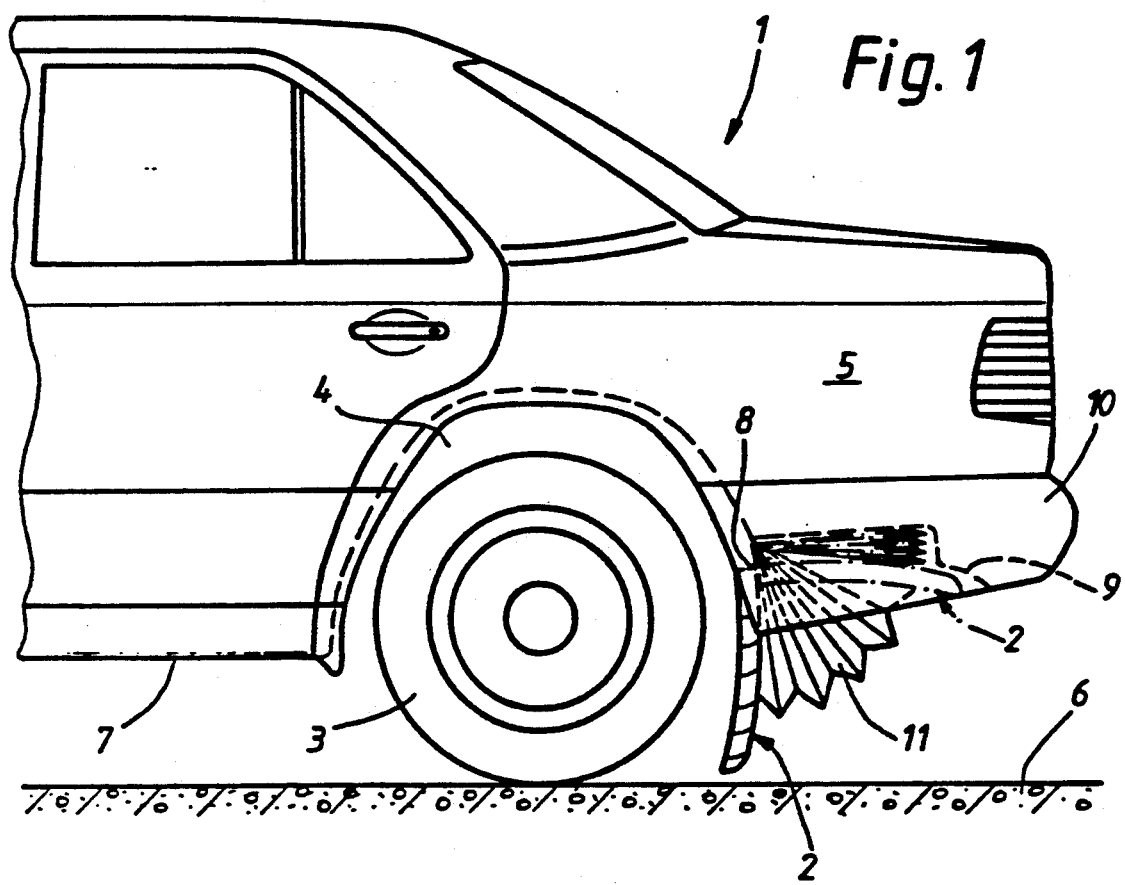
FIG. 1 is a side view of the rear region of a motor vehicle with a wheel cover constructed in accordance with an embodiment of the present invention.

An embodiment of a wheel cover 2 on the left-hand side of a motor vehicle 1 is shown on a rear region of the motor vehicle 1 shown in FIG. 1, the wheel cover 2 being designed and arranged symmetrically relative to the wheel cover on the right-hand side of the motor vehicle 1. Because the wheel cover 2 has to act as a dirt catcher and spray-water catcher, it is fitted behind the rear wheel 3 of the motor vehicle 1 in the wheelhouse 4 of the mudguard 5. In the operating position shown, the wheel cover 2 is located with its front side opposite to and at a distance from the tread periphery of the wheel 3 and extends to just above the road surface 6 in an approximately vertical transverse plane of the vehicle 1. The wheel cover 2 is suspended on the inner wall of the mudguard 5 approximately at the level of the center of the wheel 3 and its major portion protrudes downwards relative to the level of the vehicle floor 7.

In certain embodiments, the wheel cover 2 consists of a plastic which is resistant to impact but is stiff in bending. The wheel cover 2 is slightly curved over its length extending in the vertical direction so that its distance from the tread periphery of the wheel 3 is more uniform than it would be in the case of a planar cover. In its upper end region, the wheel cover 2 has a film hinge 8 by means of which it is articulated on the mudguard 5, the hinge axis extending approximately horizontally.

The wheel cover 2 can be transferred from its operating position into a non-operating position, indicated by an interrupted line and in which it is received into the body of the vehicle 1. For this purpose, the vehicle floor 7 is recessed in the area adjoining the film hinge 8 to provide an accommodation pocket 9 which is open towards the wheelhouse 4 beneath the film hinge 8. It is apparent that the vehicle floor 7 can also mean the bottom of a large-format plastic rear skirt 10, which forms the underbody region behind the wheel 3.

In order to permit the wheel cover 2 to be fixed in either its operating position or its non-operating position and to permit it to be conveniently moved from one position to the other, the rear side of the wheel cover 2 is connected to the vehicle floor 7 by means of a bi-stable pneumatic actuator 11. The actuator 11 comprises a concertina-type unit which, similar to a bellows, has one end tightly connected to the wheel cover 2 and the other end tightly connected to the vehicle floor 7. The wheel cover 2 therefore receives the desired pivoting feed by means of alternate blowing into and suction from the concertina-type unit, for example by means of a bi-pressure pump (not shown). The activation of the actuator 11 can be automatic, for example as a function of humidity sensor signals, velocity sensor signals and-/or a control signal initiated by the selection of reverse gear.

Figure 2:
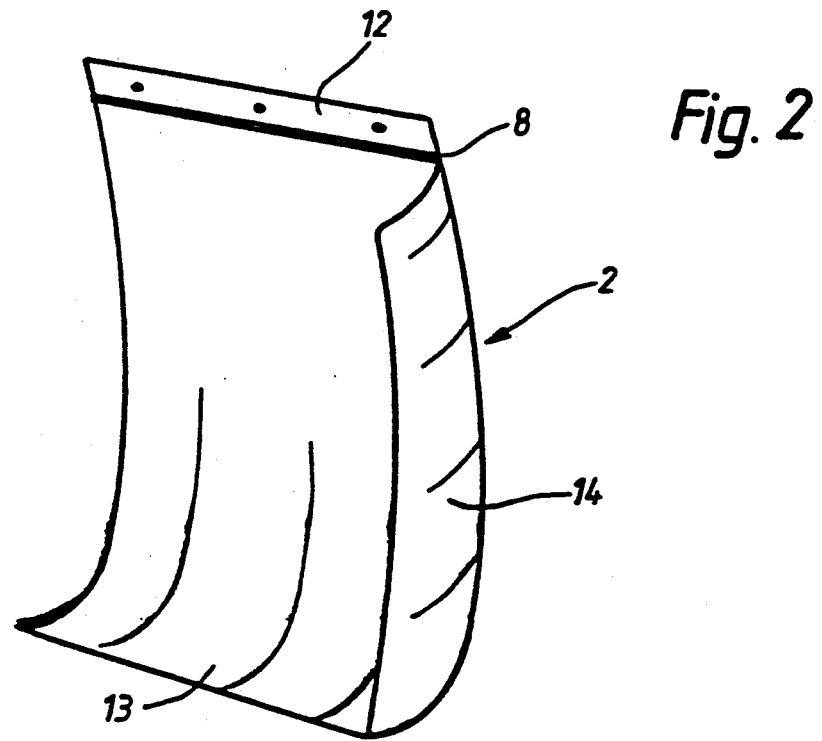
FIG. 2 is a perspective view of the wheel cover itself of the present invention.

As may be seen by reference to FIG. 2, the wheel cover 2 comprises, underneath a strip-shaped fastening flange 12 which ends at the film hinge 8, a shell body by means of which part of the spray water caught is deflected towards the inside of the wheelhouse 4 before it flows down to the road surface 6.

For this purpose, the wheel cover 2 is provided, along its lower edge, with a guide vane zone 13 angled in the direction of the tread periphery of the wheel 3. In its extent in the vehicle longitudinal direction, this guide vane zone 13 is bent downwards and thus forms a drain gutter extending in the width direction of the motor vehicle 1. At its outer end, this drain gutter is closed by means of a shield rim 14 which protrudes forwards along the outer edge of the wheel cover to approximately the same longitudinal extent as the guide vane zone 13.

The front side of the wheel cover 2 is shielded from the turbulence of the side slipstream of the wheelhouse 4 by the shield rim 14 so that spray water which has been caught can run down to the guide vane zone 13 without being pulled out of the wheel cover 2.

In addition, the guide vane zone 13 is advantageously stiffened by the shield rim 14 connected to it.

Although the wheel cover 2 is a simple, but also particularly low-cost embodiment, it exhibits a good efficiency for a relatively small amount of spray water. Nevertheless, the present invention is significantly more suitable for the avoidance of spray mist formation than conventional spray flaps in which the spray water caught runs down directly into the track of the associated wheel.

Although the embodiments described below exhibit an improved efficiency in the catchment and deflection of spray water, they require a somewhat larger configuration and accommodation space in the vehicle underbody region because they are designed as hollow bodies.

In order to simplify the further description, only the differences of the particular embodiment relative to the previously described embodiment of FIGS. I and 2 are explained. Components with the same function are provided with the same reference numerals and are made recognizable by the addition of lower-case letters for purposes of differentiation from the embodiment of FIGS. 1 and 2.

Figure 3:
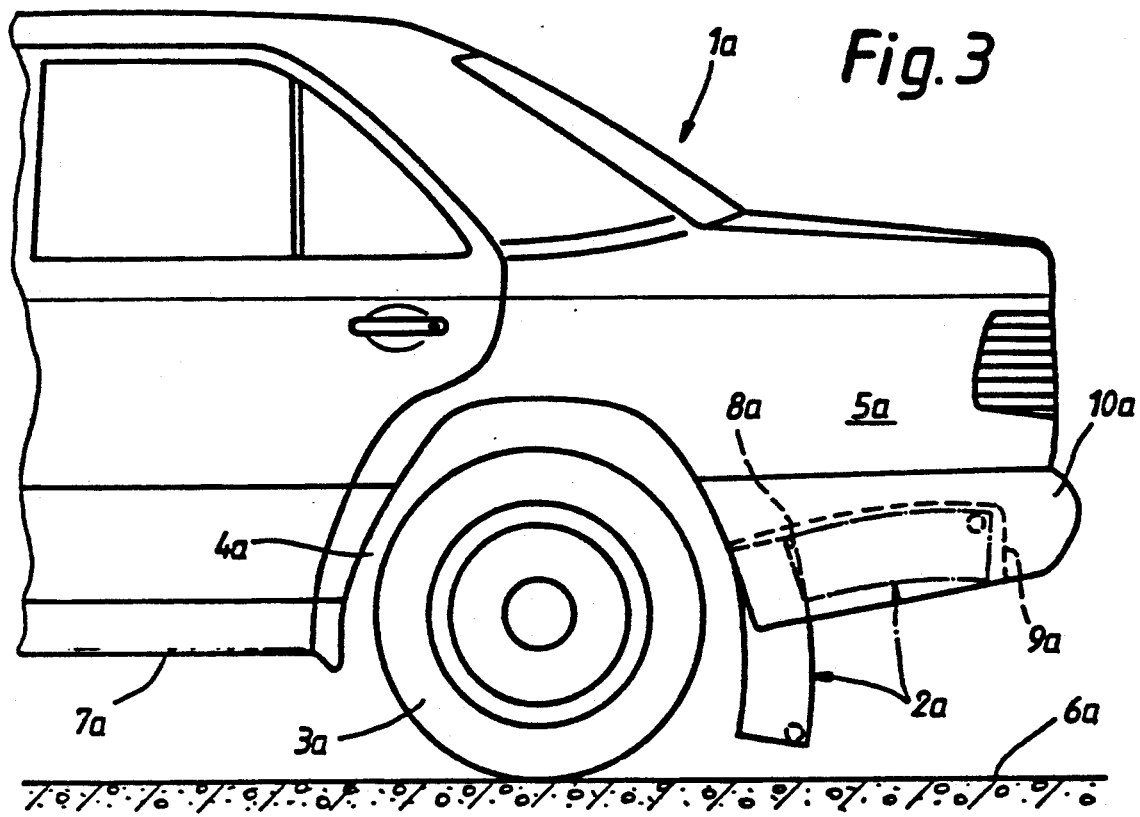
FIG. 3 is a side view of the rear region of a motor vehicle showing another wheel cover constructed in accordance with another embodiment of the present invention.
Figure 4:
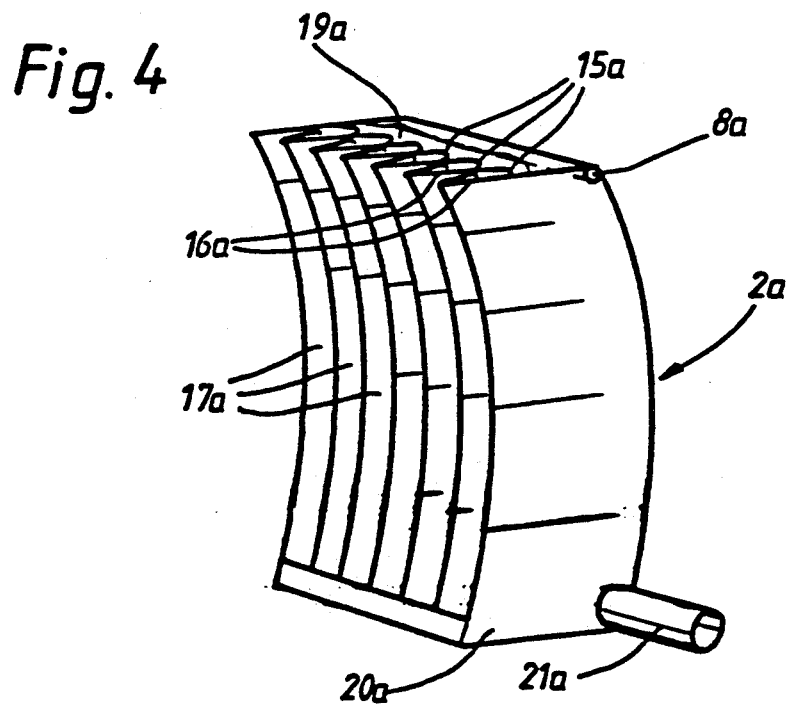
FIG. 4 shows a perspective view from the front of the wheel cover of FIG. 3 by itself.
Figure 5:
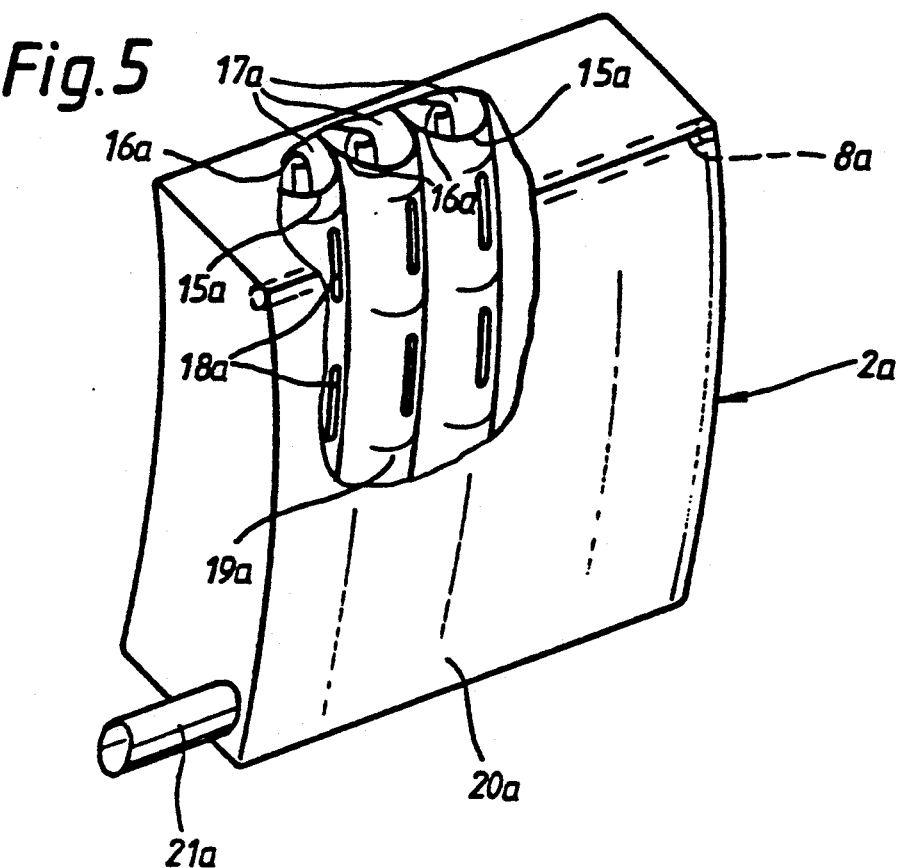
FIG. 5 shows the wheel cover of FIG. 4 in perspective view from the rear.

The wheel cover 2a of FIGS. 3, 4 and 5 is an elongated hollow body, of substantially rectangular basic cross-section, which is suspended along a rear upper edge by means of a hinge 8a between the side boundary walls of the associated accommodation pocket 9a, a pin on the body (not shown) passing through a bearing bush of the wheel cover 2a. The bearing bush of the hinge 8a can be advantageously formed on the rear wall of the wheel cover 2a, which is injection molded in impact-resistant plastic. The rear wall of the wheel cover 2a merges integrally into side walls which are in turn connected together by a catchment gutter configuration on the side facing towards the tread periphery of the wheel 3a. This configuration includes six spray-water catchment shells 15a extending adjacent to one another in the peripheral direction of the wheel 3a, the shells 15a being connected to one another along their longitudinal sides which butt together. Each of the catchment shells 15 each have a U-shaped cross-section.

All the spray-water catchment shells 15a are covered by an associated drain gutter 16a over half their clear width, this drain gutter 16a being formed at one edge of the spray-water catchment shells 15a with its clear wedge cross-section facing towards the catchment cross-section of the spray-water catchment shells 15a. Because of this design, the drain gutters 16a, extending at a distance from and adjacent to one another, simultaneously form boundaries to wedge-shaped cross-section catchment pockets 17a. As may be seen from the rear view of FIG. 5 (in the exposed region of the wheel cover 2a ), the spray-water catchment shells 15a are penetrated by a plurality of narrow slots 18a distributed over their length and extending centrally along them. Part of the spray water caught can pass through these slots 18a into the drain channel 19a lying behind them so that the catchment capacity of the wheel cover 2a is increased.

In the operating position of the wheel cover 2a, therefore, part of the spray water thrown into the catchment pockets 17a is deflected by the spray-water catchment shells 15a into the drain gutters 16a and drains downwards within the gutters 16a. The other part of the spray water drains downwards in the drain channel 19a to the lower end of the wheel cover 2a. The lower end of the wheel cover 2a is closed to provide a water box 20a into which the drain gutters 16a and the drain channel 19a emerge. At its lowest point, the water box 20a is penetrated at the side by a round outlet opening which is surrounded by a stub pipe 21a formed on the water box 20a and protruding towards the center of the vehicle. The spray water collected in the water box 20a runs through the stub pipe 21a onto the road surface 6a in a quiet underflow region of the vehicle floor 7a. So that the configuration of the stub pipe 21a can be recognized, FIG. 4 and 5 each show the symmetrical wheel cover 2a of the right-hand side of the vehicle.

Figure 6:
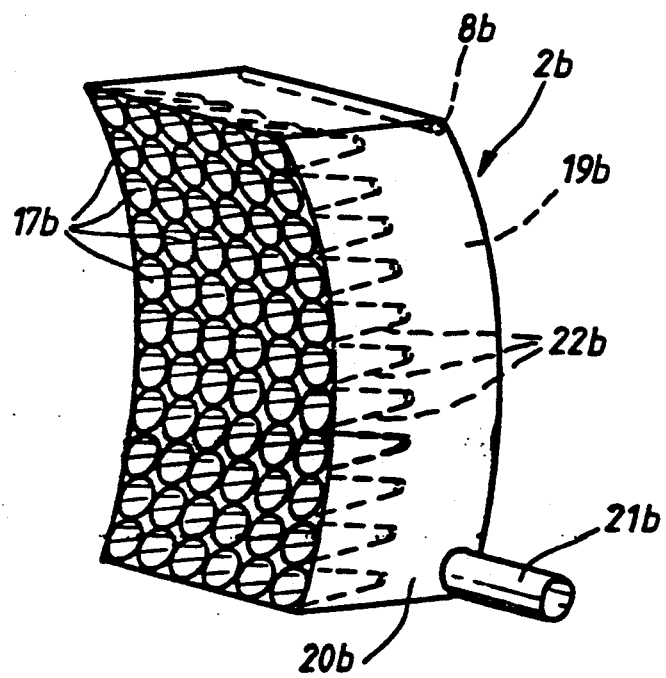
FIG. 6 illustrates another embodiment of the wheel cover of the present invention.

The same applies to the wheel cover 2b which can be seen in FIG. 6, which shows an alternative embodiment of the wheel cover 2a. Instead of a catchment gutter configuration, the wheel cover 2b has a honeycomb structure in which a large number of tubular bodies 22b of truncated cone shape or truncated pyramid shape are connected to one another to provide a peripheral wall of the wheel cover 2b. Each of the tubular bodies 22 forms, by this means, a wedge-shaped catchment pocket 17b whose outlet cross-section is located in the drain channel 19b and whose central longitudinal axis is directed to suit the main spray direction of the spray water. The functional principle of the wheel cover 2b is already described in German Patent Document DE-OS 39 39 937 and is not therefore explained in any more detail.

The wheel covers 2a and 2b can also be pivoted by means of an actuator (not shown) into the accommodation pocket 9a or back out of the pocket 9a into the operating position. Instead of a pneumatic actuator, an electric motor or hydraulic drive can be used.

An embodiment of a wheel cover 2c is shown in FIG. 7, 8 and 9, which can be retracted into a longer but substantially flatter accommodation pocket 9c of the vehicle floor 7c. For this purpose, the hollow body of the wheel cover 2c consists of two box-shaped preformed shells 23c and 24c, the preformed shell 23c comprising a front half of the wheel cover 2c and the preformed shell 24c comprising a rear half of the wheel cover 2c. In their operating position, the two halves interact with sealing around them. The wheel cover 2c is suspended near the lower edge of the rear skirt 10c by means of a hinge 8c and therefore requires practically no installation space in the wheelhouse 4c. The hinge 8c is located in an overlap region at the rear edge of the preformed shell 23c, the preformed shells 23c and 24c butting together in this region to form a seal. At the end region of the preformed shells 23c and 24c opposite to the hinge 8c, i.e. in the lower overlap region, the preformed shell 24c is connected to the preformed shell 23c by means of a further hinge 25c with its axis parallel to the hinge 8c.

So that the preformed shell 23c provided with the catchment pockets 17c can be pivoted about the hinge 8c from its vertical operating position up into the accommodation pocket 9c, the preformed shell 24c bounding the major part of the drain channel 19c must first be pivoted downwards around the hinge 25c, the free space below the rear skirt 10c being insufficient, however, for the pivoting motions to be carried out in sequence.

For this reason, as seen in FIGS. 9, a superimposed motion control is provided in which the preformed shells 23c and 24c are folded apart around the hinge 25c and are simultaneously pivoted upwards around the hinge 8c. In the non-operating position, the preformed shells 23c and 24c are located in an extended position, folded apart by 180°, retracted one behind the other in the accommodation pocket 9c so that they are no longer visible from outside.

When the wheel cover 2c is extended, the motion control takes place in reverse so that the preformed shells 23c and 24c are returned to their operating position, folded one upon the other, as is shown in FIG. 8.

In a simplified configuration, all of the described embodiments of the wheel covers 2, 2a, 2b and 2c can also be pivoted from their operating position into their non-operating position and vice versa by manual action. In this case, however, retention means which could pivotably lock the wheel covers 2, 2a, 2b and 2c in both positions would be necessary.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A wheel cover for catching spray water or dirt, which is pivotably suspended on a vehicle body and has an operating position located opposite to and at a distance from a tread periphery of an associated wheel and protrudes downwards relative to a level of a floor of said vehicle body, and which is pivotable up from the operating position into a non-operating position under the vehicle floor, wherein said wheel cover includes first and second preformed shells foldably connected together, said preformed shells forming a hollow body in said operating position when folded one upon the other, said first preformed shell facing towards the tread periphery and being penetrated by catchment pockets, said first preformed shell bounding, jointly with the second preformed shell, a drain channel, and wherein the preformed shells are movable upwardly into an unfolded non-operating position in which said preformed shells are located under the vehicle floor one behind the other in a longitudinal direction of the vehicle body.

2. The wheel cover according to claim 1, further comprising a recess of the vehicle floor into which the wheel cover is retracted in the non-operating position of the wheel cover.

3. The wheel cover according to claim 2, wherein the wheel cover is hinged in the recess on the vehicle floor.

4. The wheel cover according to claim 2, wherein the wheel cover which comprises the hollow body formed by the preformed shells is elongated with a substantially rectangular basic cross-section.

5. The wheel cover according to claim 1, wherein one of said preformed shells bounds a major cross-section of the drain channel.

6. The wheel cover according to claim 1, wherein the hollow body has a stub pipe for draining the spray water, said stub pipe being located to a side of a lower end of the hollow body, as seen in the operating position of the wheel cover.

7. The wheel cover according to claim 1, wherein the wheel cover is pivotable up in the longitudinal direction of the vehicle into the non-operating position.

* * * * *